US011879630B2

(12) United States Patent
Rasmussen et al.

(10) Patent No.: US 11,879,630 B2
(45) Date of Patent: Jan. 23, 2024

(54) LIGHT FIXTURE

(71) Applicant: HARMAN PROFESSIONAL DENMARK APS, Aarhus N (DK)

(72) Inventors: Niels Jørgen Rasmussen, Egaa (DK); Robin Sandomeer, Lystrup (DK)

(73) Assignee: Harman Professional Denmark APS, Aarhus N (DK)

( * ) Notice: Subject to any disclaimer, the term of this patent is extended or adjusted under 35 U.S.C. 154(b) by 10 days.

(21) Appl. No.: 17/680,139

(22) Filed: Feb. 24, 2022

(65) Prior Publication Data

US 2022/0275929 A1 Sep. 1, 2022

(30) Foreign Application Priority Data

Mar. 1, 2021 (DK) ............................. PA202170092

(51) Int. Cl.
*F21V 31/00* (2006.01)
*F21V 21/30* (2006.01)

(52) U.S. Cl.
CPC ............ *F21V 31/005* (2013.01); *F21V 21/30* (2013.01)

(58) Field of Classification Search
CPC ......... F21V 31/005; F21V 21/30; F21V 15/01
See application file for complete search history.

(56) References Cited

U.S. PATENT DOCUMENTS 4,489,368 A 12/1984 Sangiamo et al.
2009/0213595 A1* 8/2009 Alexander .............. F21V 19/04 362/373
2013/0155688 A1* 6/2013 LaVigna ................. F21V 21/00 362/311.01
2018/0320837 A1* 11/2018 Romano ................. F21V 29/74

FOREIGN PATENT DOCUMENTS

CN 207019013 U 2/2018
CN 210511307 U 5/2020
CN 210891216 U * 6/2020
CN 210891216 U 6/2020
DE 9417114 U1 2/1995
EP 2 623 855 A1 8/2013
WO 2011/079387 A1 7/2011

OTHER PUBLICATIONS

NPL Search Innovation Q+ ip.com.*

* cited by examiner

*Primary Examiner* — Anabel Ton
(74) *Attorney, Agent, or Firm* — Artegis Law Group, LLP

(57) ABSTRACT

A light fixture, such as a moving head light fixture, comprises a first element and a second element joined by cooperating first and second attachment structures. The first attachment structure is located in a first compartment in the first element and extends in a first direction towards the second element. The second attachment structure forms part of the second element. To facilitate rain protection of the joint, the first element comprises an outwardly projecting wall portion forming a first collar circumferentially around a first opening in the first element, where the projecting wall portion extends in a second direction being transverse to the first direction and terminates in a first free edge outside the first compartment. The second element comprises a groove configured to receive the first collar, where the groove extends circumferentially around a centre axis of the second attachment structure.

10 Claims, 7 Drawing Sheets

LIGHT FIXTURE

CROSS-REFERENCE TO RELATED APPLICATIONS

The present application claims the benefit of Danish patent application titled "A LIGHT FIXTURE," filed on Mar. 1, 2021, and having Application No. DK PA202170092. The subject matter of this related application is hereby incorporated herein by reference.

BACKGROUND

Field of the Various Embodiments

The present disclosure relates to a light fixture comprising a first element and a second element joined by cooperating first and second attachment structures, and in particular to rain protection of such a joint.

Description of the Related Art

In many industrial applications ingress protection is applied to improve robustness against water and particles, such as dust. Normally this causes increased cost and complexity, lower serviceability etc. When the protection is applied to rotational joints, the solution often includes special sealings and hydrophobic grease where the drawback is higher friction and noise. Ventilation holes are rarely applied due to the risk of ingress and soaking dust filters.

In entertainment and architectural lighting, light fixtures, such as moving head light fixtures, are often used outdoor with the risk of rain showers. Therefore, the product should either be placed safely under a roof or it should be ingress protected with IP class×5 or higher. IP×5 products are both expensive, heavy and complex to service compared to its IP20 indoor relatives. One of the most critical sections of a moving head light fixture is the rotationally joints between base and yoke and between yoke and head. The complexity of rain protecting these joints is increased due to the fact that there are substantially no limitations in relation to rigging orientation of such light fixtures.

SUMMARY

It is an object of embodiments of the disclosure to provide an improved light fixture.

It is a further object of embodiments of the disclosure to provide a light fixture with an improved rain protection of a joint.

According to a first aspect, the disclosure provides a light fixture comprising a first element and a second element joined by cooperating first and second attachment structures, wherein the first attachment structure is located in a first compartment in the first element and extends in a first direction towards the second element, wherein the second attachment structure forms part of the second element, wherein the first element comprises an outwardly projecting wall portion forming a first collar circumferentially around a first opening in the first element, the projecting wall portion extending in a second direction being transverse to the first direction and terminating in a first free edge outside the first compartment, wherein the second element comprises a groove configured to receive the first collar, the groove extending circumferentially around a centre axis of the second attachment structure.

The light fixture comprises at least a first element and a second element which are joined by cooperating first and second attachment structures. When the first attachment structure engages the second attachment structure, the first and second elements are jointed.

The first attachment structure is located in a first compartment in the first element and extends in a first direction which may preferably be towards the second element to facilitate engagement between the two attachment structures. The first attachment structure may be formed integrally with the first elements to thereby form a single element. Alternatively, the first attachment structure may be a separate element which is attached to an inner surface of the first element to thereby locate the first attachment structure in the first compartment. It should further be understood that the first attachment structure may be attached to the first element via one or more additional elements. The first element may likewise be formed in one piece or may alternatively be formed by at least two shell parts which are subsequently joined to form the first element comprising the first compartment.

A first opening is formed in the first element to allow the first attachment structure to engage the second attachment structure which forms part of the second element. The second attachment structure may be formed integrally with the second elements to thereby form a single element. Alternatively, the second attachment structure may be a separate element which is attached to the second element.

The first and second elements being joined by cooperation first and second attachment structures may each comprise an outer surface part facing the other one of the first and second element. In one embodiment, these outer surface parts may be in contact with each other, when the first and second attachment structures engage each other. In an alternative embodiment, the first and second elements may only be in contact with each other via the first and second attachment structures engaging each other.

The first and/or second attachment structures may each be formed by a single element or may each alternatively be joined by a plurality of element which in an assembled configuration forms each of the first and/or second attachment structures.

In one embodiment, the first attachment structure may extend in the first direction out of the first opening to facilitate engagement between the first attachment structure and the second attachment structure. It should however be understood that the first and second attachments structures may also engage each other via the first opening in the first element in embodiments where the first attachment structure does not extend out of the first compartment via the first opening in the first element.

The first element comprises an outwardly projecting wall portion forming a first collar circumferentially around a first opening in the first element. The outwardly projecting wall portion may be formed integrally with a wall portion forming the compartment of the first element, e.g. by 3D printing. Alternatively, the outwardly projecting wall portion may be formed as a separately element which is subsequently attached to an outer surface of the first element.

The outwardly projecting wall portion extends in a second direction which is transverse to the first direction and terminates in a first free edge outside the first compartment, thereby forming a collar on the outer surface circumferential the first opening. When rain falls onto the light fixture, raindrops may stick to an outer surface to the first and/or second element due to surface adhesion forces in the water, and the raindrops may the follow the outer surface of the first and/or second element. By providing a collar circumferentially around the first opening, where the outwardly projecting wall portion extends in a second direction transverse to the first direction and terminates in a first free edge outside the first compartment, the raindrops may be guided away from the first opening and even ramped off to allow drainage of water away from the opening substantially independent of the orientation of the joint.

The second element comprises a groove configured to receive the first collar, where the groove extends circumferentially around a centre axis of the second attachment structure. The groove forms an opening configured to receive the first collar. When arranging the first collar in the groove, this may provide additional protection of the first opening and thereby the joint, as the groove provides additional guidance for the raindrops away from the first opening.

The collar may in one embodiment be substantially U-shaped; i.e. formed by two substantially parallel leg joined by an intermediate section forming the bottom part of the U-shape. The U-shape may be a sharp-edged U, where the two legs and the intermediate section are joined at corners being substantially 90 degrees. In this case, the first direction and the second direction may be substantially perpendicular to each other. Alternatively, the corners of the U-shape may be arch-shaped. In a further alternative, the two legs of the U-shape extending from opposite ends of the intermediate section may be non-parallel, e.g. by extending in opposite directions from the intermediate section, one leg may form a 90 degrees angle with the intermediate section, while the other leg may form above 90 degrees, such as an angle in the range of 90-110, or even higher, to the intermediate section. In a further alternative embodiment, the collar may be substantially V-shaped.

It should be understood, that both a U-shaped collar and a V-shaped collar may be formed by the outwardly projecting wall portion in cooperation with an outer surface of the first element, as a first leg may be formed by a part of the outer surface of the first element, whereas a second leg and an intermediate section may be formed by the outwardly protecting wall portion.

The groove may extend from an outer surface of the second element towards the first element. This may facilitate receipt of the outwardly projecting wall portion forming the first collar in the groove.

In one embodiment, the second element may comprise a second compartment with a second opening, where the second attachment structure may be arranged in the second compartment. In one embodiment, the second attachment structure may extend out of the second opening to facilitate engagement between the first attachment structure and the second attachment structure. It should however be understood that the first and second attachments structures may also engage each other via the second opening in the second element in embodiments where the second attachment structure does not extend out of the second compartment via the second opening in the second element.

The second attachment structure may extend substantially in the first direction as the first attachment structure to facilitate joining of the two elements by the first and second attachments structures.

By extending in the first direction, should be understood, that at first attachment structure at one end may be attached to an inner surface of the first compartment and at an opposite end may be configured to engage the second attachment structure. The direction from the attachment point in the first compartment towards the opposite end may thus be the first direction. The first direction may preferably be a direction toward the second element, such a towards the second attachment element.

A least one of the first and second compartments may be formed by two or more shell parts which may subsequently be assembled to form the compartment(s). The first and/or second attachment structure(s) may be formed integrally with a shell part or may be formed separately and subsequently attached to the one or mere shell parts. The first and second element may preferably be made of a thermoplastic material. In embodiment, the first and second attachment structures are made as separate element subsequently attached to the first and the second element, respectively, the first and second attachment structures may likewise be made of a thermoplastic material. It should however be understood, that other materials may also be applicable.

In one embodiment, at least one of the first opening and the second opening may be substantially circular. It should however be understood, that at least one of the openings may alternatively oval, elliptic, square-shaped, or otherwise shaped. In embodiments having a square-shaped opening, the corners of the openings may be arch-shaped.

The first attachment structure may be configured to movably engage the second attachment structure thereby forming a rotational joint between the first and second elements. In these embodiments, the joint between the first and second element may constrain motion of the two elements to substantially pure rotation along a common axis, where the common axis may extend in the first direction. In one embodiment, this may be achieved by a first attachment structure comprising a rod-like element and a second attachment structure forming an indentation of matching shape. It should be understood, that in an alternative embodiment, the first attachment structure may form the indentation, whereas the second attachment element may comprise a rod-like element configured to be received in the indentation having an inner shape matching the outer shape of the rod-like element. The first and/or second attachment structure may further comprise additional elements cooperating with the rod-like element and/or indentation to form the joint, such as bearings. It should further be understood that a rod-like element and a matching indentation is an example of an embodiment of a joint, and that other types of first and second attachments structures may also be applied when joining a first and second element of a light fixture.

The first and second attachment structure may each comprise a through hole extending from one outer surface of the attachment structure to an opposite other outer surface. The through holes may be substantially centrally arranged, whereby a common through hole may be provided when the first and second attachment structures engage. In one embodiment, the common through hole may provide a passage between the first and second compartment. The passage may as an example provide a path for a cable.

In one embodiment, the groove formed at the second element may comprises a first outwardly extending surface portion and a second outwardly extending surface portion, where each of the first and second outwardly extending surface portions may extend substantially towards the first element from an outer surface of the second element and terminating at an opposite end point. The first and second outwardly extending surface portions may each extend circumferential around the centre axis of the second attachment structure.

Each of the first and second outwardly extending surface portions may extend circumferential around the centre axis of the second attachment structure and in embodiments where the second elements comprises a second opening, each of the first and second outwardly extending surface portions may extend circumferentially around the second opening. It should be understood, that the shape of each of the first and second outwardly extending surface portions may be different that the shape of the second opening. As an example, the second opening may be a circular opening, whereas as the first outwardly extending surface portion may be oval, and second outwardly extending surface portion may be elliptic in a plane parallel to the second opening (a plane substantially perpendicular to the first direction). In one embodiment, each of the first and second outwardly extending surface portions and the second opening may be of the same shape in the plane of the opening, e.g. all three elements being circular.

Thus, the first and second outwardly extending surface portions may extend substantially parallel circumferential around the centre axis of the second attachment structure.

The first and second outwardly extending surface portions may each have a height being a distance from the outer surface of the second element where they are attached to the end point. The first outwardly extending surface portion may be arranged closer to the centre axis of the second attachment structure than the second outwardly extending surface portion, whereby the second outwardly extending surface portion may extend circumferential around the first outwardly extending surface portion and the centre axis of the second attachment structure. The height of the first outwardly extending surface portion may be equal to or larger than the height of the second outwardly extending surface portion. By providing the first outwardly extending surface portion with a height being larger than the height of the second outwardly extending surface portion, drainage of water away from the compartment(s) and the first and second attachment structures may be facilitated.

Each of the first and second outwardly extending surface portions may in a cross-section transverse to the height be substantially uniform, whereby each of the first and second outwardly extending surface portions may be substantially plate-shaped elements extending circumferentially around the centre axis of the second attachment structure.

In an alternative embodiment, at least one of the first and second outwardly extending surface portions may have a width decreasing towards the end point of these elements.

The first and second outwardly extending surface portions may in one embodiment together form a substantially U-shape, where the first and second outwardly extending surface portions each forms a leg in the U-shape. The legs may be substantially parallel extending towards the first element. In an alternative embodiment, the first outwardly extending surface portion may extend towards the first element at an angle of substantially 90 degrees relative to the outer surface of the second element, whereas the second outwardly extending surface portion may extend away from the centre axis of the second attachment structure, thereby extending towards the first element at an angle above 90 degrees, such as in the range of 90-110 degrees.

The second element may comprise a third outwardly extending surface portion, where the third outwardly extending surface portion may extend circumferential around the first outwardly extending surface portion, the second outwardly extending surface portion, and the centre axis of the second attachment structure. The height of the third outwardly extending surface portion may be smaller than the height of the first outwardly extending surface portion and smaller than or equal to the height of the second outwardly extending surface portion to thereby facilitate drainage of water away from the compartment(s) and the first and second attachment structures.

In one embodiment, at least one of the first, second, and third outwardly extending surface portions may extend circumferentially around the centre axis of the second attachment structure in a substantially circular shape.

In an alternative embodiment, the groove may comprise a second outwardly projecting wall portion forming a second collar circumferentially around the centre axis of the second attachment structure, where the second projecting wall portion extending in a third direction being transverse to the first direction and terminating in a second free edge outside the second element.

The second collar may be substantially U-shaped; i.e. formed by two substantially parallel leg joined by an intermediate section forming the bottom part of the U-shape. The U-shape may be a sharp-edged U, where the two legs and the intermediate section are joined at corners being substantially 90 degrees. In this case, the first direction and the third direction may be substantially perpendicular to each other. Alternatively, the corners of the U-shape may be arch-shaped. In a further alternative, the two legs of the U-shape extending from opposite ends of the intermediate section may be non-parallel or the collar may be substantially V-shaped, as described above in relation to the first collar.

It should be understood, that both a U-shaped second collar and a V-shaped second collar may be formed by the second outwardly projecting wall portion in cooperation with an outer surface of the second element, as a first leg may be formed by a part of the outer surface of the second element and as a second leg and an intermediate section may be formed by the second outwardly protecting wall portion.

To further facilitate drainage of water away from the compartment(s) and the first and second attachment structures, the first element and the second element may comprise at least one additional outwardly extending surface portion extending toward the other one of the first and second element circumferentially around the first opening/the centre axis of the second attachment structure.

The additional outwardly extending surface portions may extend substantially circumferential around the first opening/the centre axis of the second attachment structure in a circular form, whereby the additional outwardly extending surface portion may extend parallel to a first opening being circular.

The additional outwardly extending surface portion may further extend circumferentially around the first collar.

The additional outwardly extending surface portion may in a cross-section transverse to the height be substantially uniform, whereby the additional outwardly extending surface portion may be a substantially plate-shaped element extending circumferentially around the first opening and the first collar/the centre axis of the second attachment structure.

In an alternative embodiment, the additional outwardly extending surface portion may have a width decreasing towards the end point hereof.

BRIEF DESCRIPTION OF THE DRAWINGS

Embodiments of the disclosure will now be further described with reference to the drawings, in which.

DETAILED DESCRIPTION

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
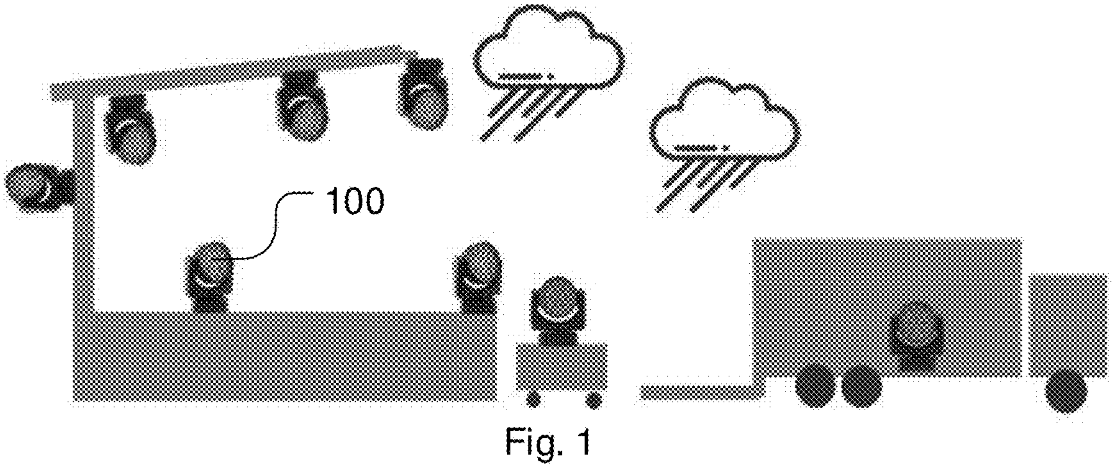
FIG. 1 illustrates different rigging positions for a moving head light fixture.

FIG. 1 illustrates different rigging positions for a light fixture 100 in the form of a moving head light fixture. The light fixture 100 is in the illustrated embodiment positioned in a truck 250 illustrating transportation to an entertainment site. At the entertainment site (left part of the figure), the light fixture 100 is positioned on a stage 252 and hanging above the stage from a covering 254. In the middle of the figure, a light fixture 100 is moved from the truck 250 to the stage 252 on a cart 256. The light fixture 100 may be exposed to rain both during the movement from the truck 250 and while positioned on the stage 252 and while hanging from the covering 254.

Figure 2:
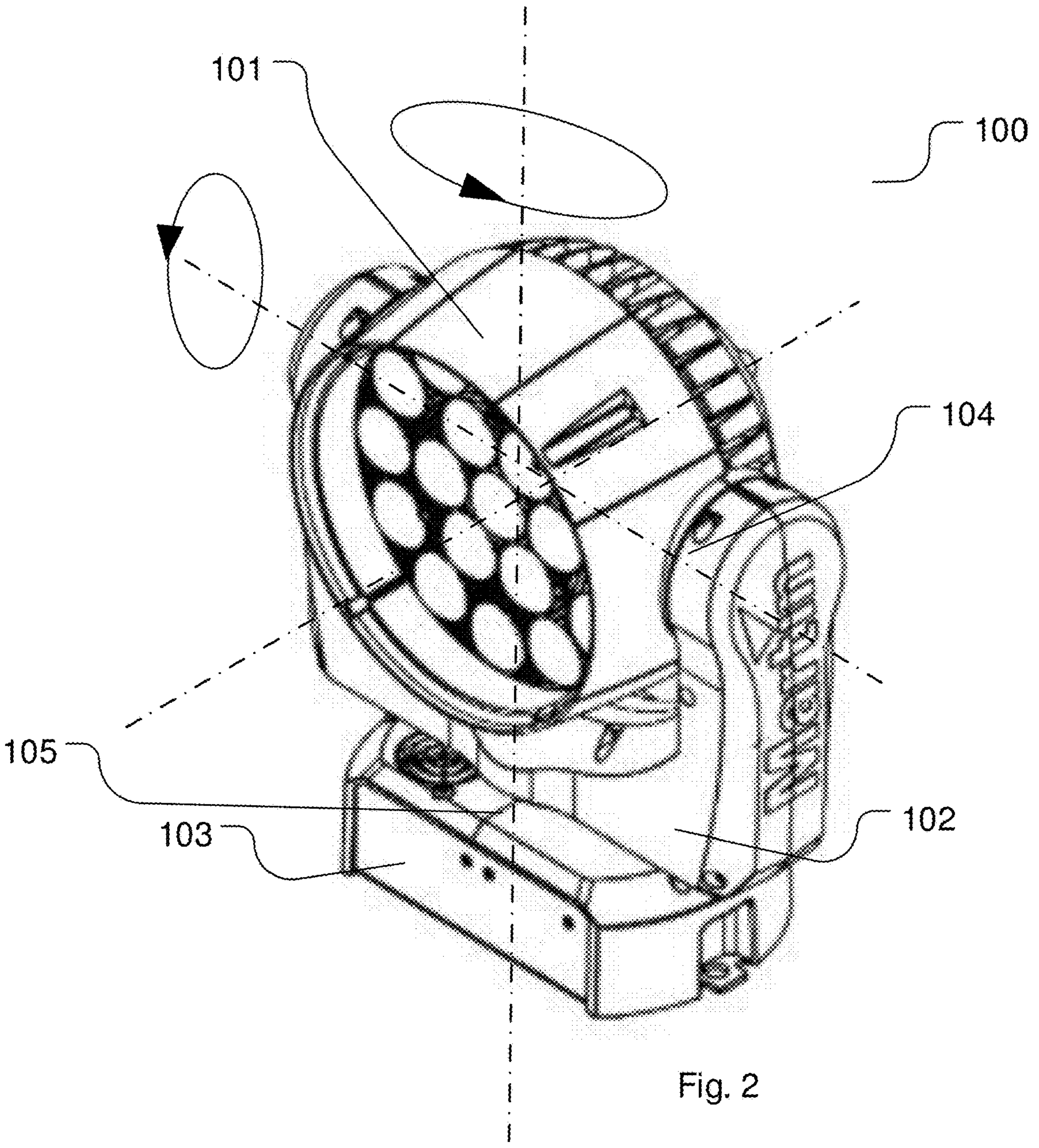
FIG. 2 illustrates a moving head light fixture with rotatable joints for rotation around two axis.

FIG. 2 illustrates a moving head light fixture 100 with two rotatable joints 104, 105 for rotation around two axes. The light fixture 100 comprises a head 101, a yoke 102, and a base 104. A first joint 104 is arranged between the head 101 and the yoke 102. A second joint 105 is arranged between the between base 103 and the yoke 102. If the light fixture 100 is expose to rain, or has been exposed to rain, water may enter the joints 104, 105 during use, e.g. when reorientation the light fixture 100.

Figure 3:
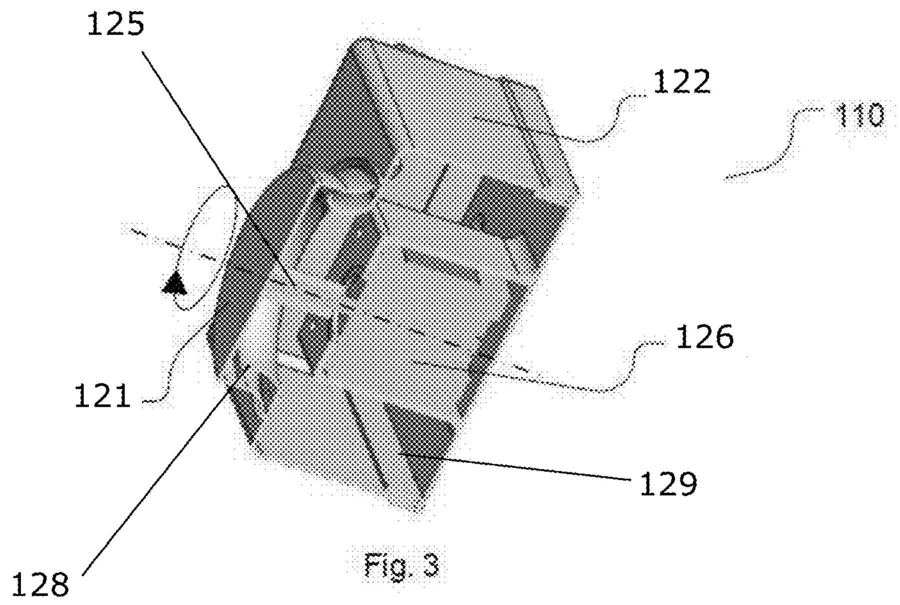
FIG. 3 illustrates a section through an embodiment of a joint.
Figure 4:
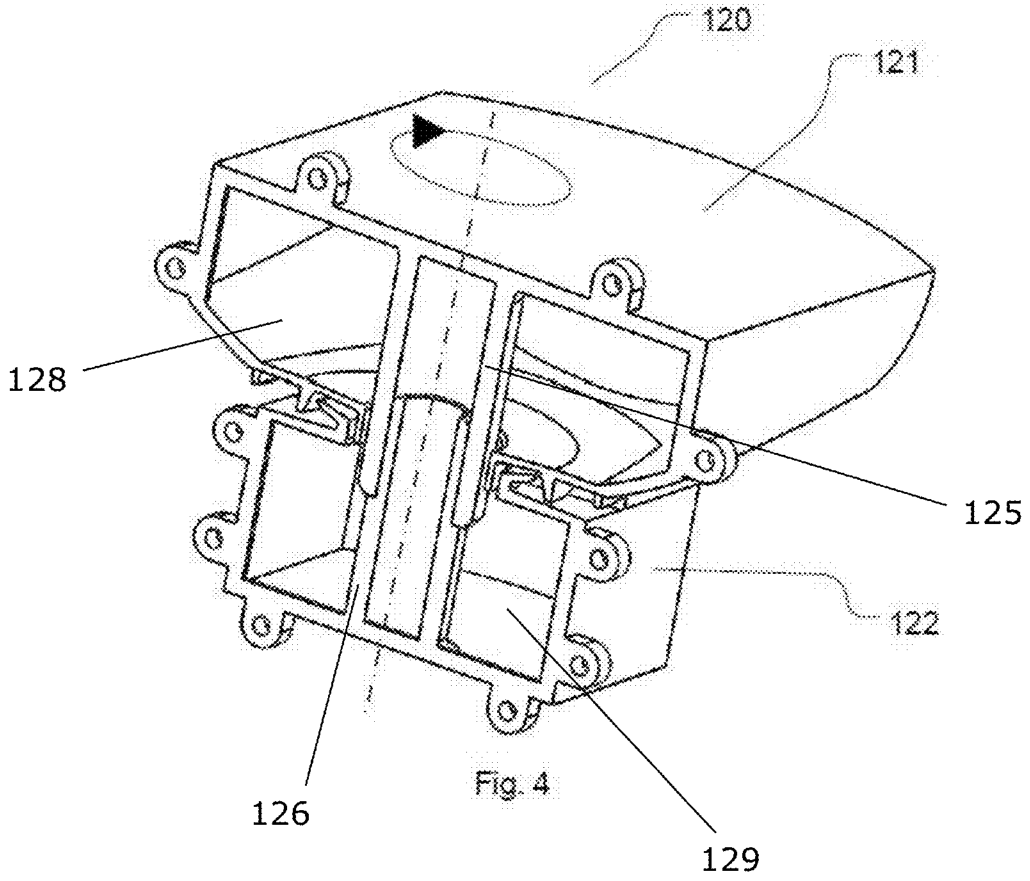
FIG. 4 illustrates a section through an alternative embodiment of a joint.

FIGS. 3 and 4 schematically illustrate a section through two different embodiments of a joint 110, 120 of a light fixture 100 where most of the element of the light fixture has been left out.

The light fixture 100 comprises a first element 121 and a second element 122 joined by cooperating first and second attachment structures 125, 126. The first attachment structure 125 is located in a first compartment 128 in the first element 121 and extends in a first direction towards the second element 122. In the illustrated embodiment, the second attachment structure 126 is located in a second compartment 129 and forms part of the second element 122.

Figure 5:
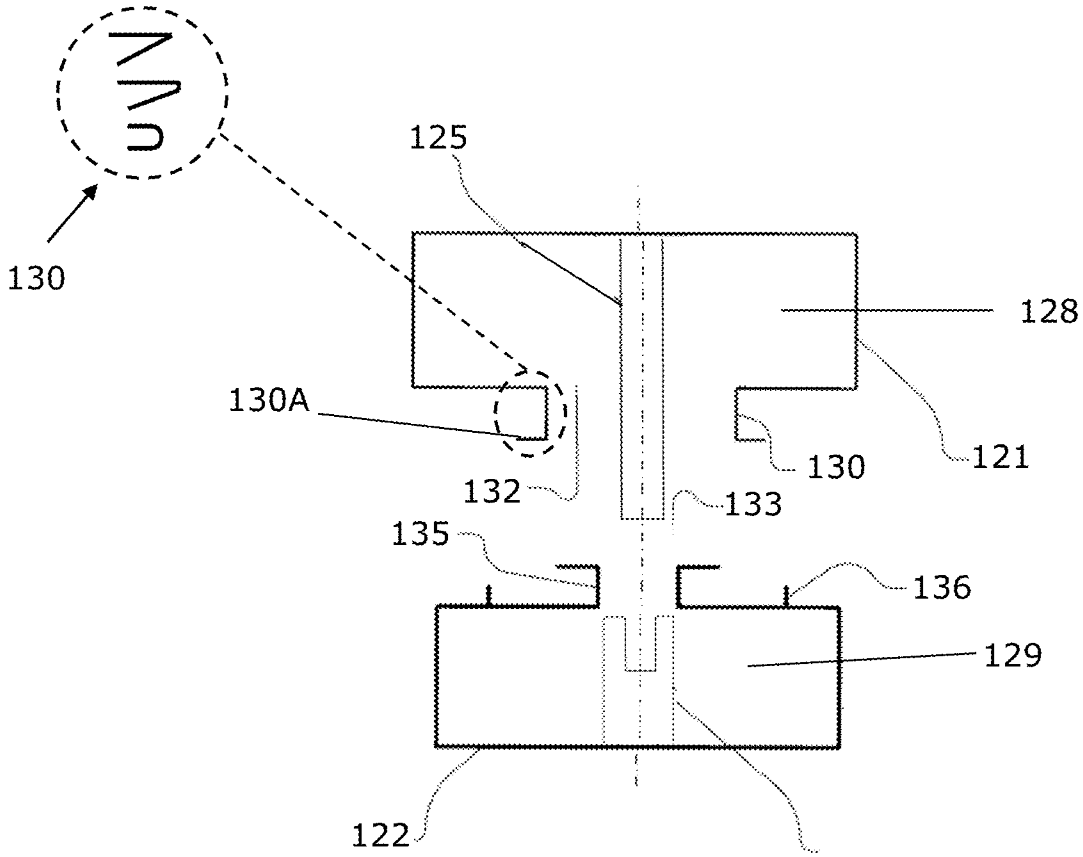
FIG. 5 illustrates a 2D section through the embodiment illustrated in FIG. 3.
Figure 6:
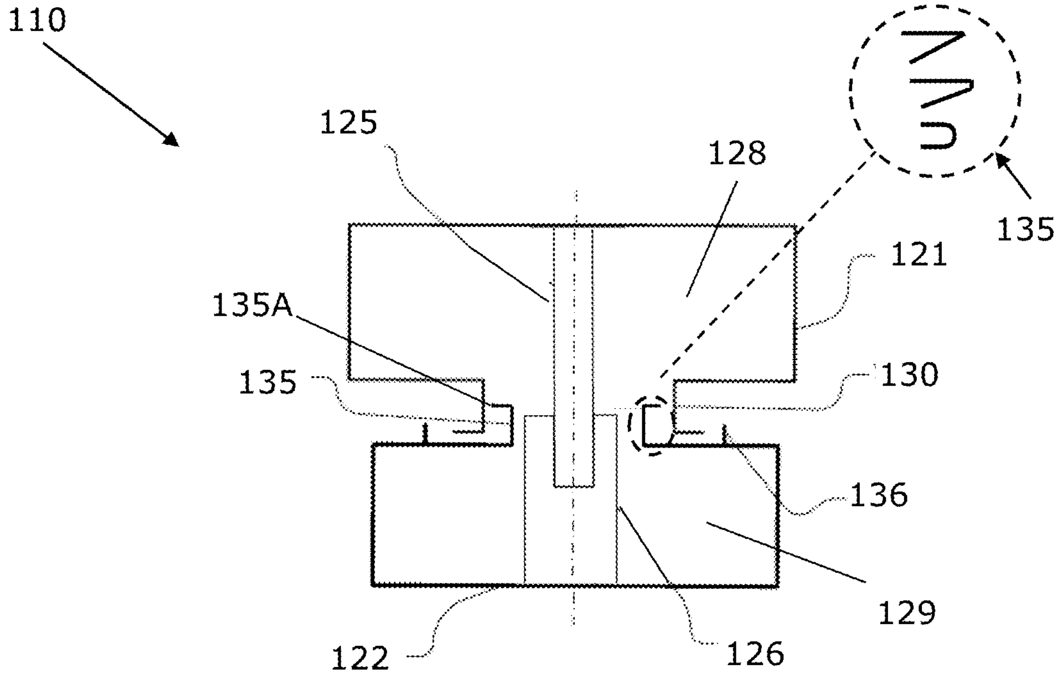
FIG. 6 illustrates the embodiment of FIG. 5 in assembled configuration.

FIG. 5 schematically illustrates a 2D section through the embodiment of the light fixture 100 illustrated in FIG. 3 in an un-assembled configuration. In FIG. 6, the embodiment illustrated in FIG. 5 is illustrated in an assembled configuration. The figures schematically illustrate the first and second elements of the light fixture whereas most of the different elements of the light fixture itself have be left out.

In FIG. 5, the first and second attachment structures 125, 126 do not engage. In FIG. 6, the first and second attachments structures 125, 126 engage each other to form a rotational joint 110 between the first element 121 and the second element 122.

The first element 121 comprises an outwardly projecting wall portion 130 forming a first collar circumferentially around a first opening 132 in the first element 121. The projecting wall portion 130 extends in a second direction being transverse to the first direction and terminates in a first free edge 130A outside the first compartment 128.

The first collar 130 is substantially U-shaped; i.e. formed by two substantially parallel legs joined by an intermediate section forming the bottom part of the U-shape. As illustrated, the U-shape may be a sharp-edged U, where the two legs and the intermediate section are joined at corners being substantially 90 degrees. As further illustrated by the dotted circles, the collar 130 may alternatively have another shape, such as substantially V-shaped, a U-shape where the two legs of the U-shape do not extending in parallel, or a U-shape with arch-shaped corners at the attachment points for the legs. In a further alternative, the collar may be of another shape.

In the illustrated embodiment, a second opening 133 is formed in the second element. The second element 122 comprises a groove 135 configured to receive the first collar 130 (see FIG. 6). The groove 135 extends circumferentially around a centre axis of the second attachment structure 126 and the second opening 133.

In the embodiment illustrated in FIGS. 5 and 6, the groove 135 comprises a second outwardly projecting wall portion forming a second collar circumferentially around the centre axis of the second attachment structure, where the second projecting wall portion extending in a third direction being transverse to the first direction and terminating in a second free edge 135A outside the second element 122.

The second collar 135 may have another shape in an alternative embodiment, as described above in relation to the first collar 130.

The second element 122 comprises an additional outwardly extending surface portion 136 extending toward the first element 121 circumferentially around the second opening 133 and the groove 135 in the form of a second collar.

Figure 7:
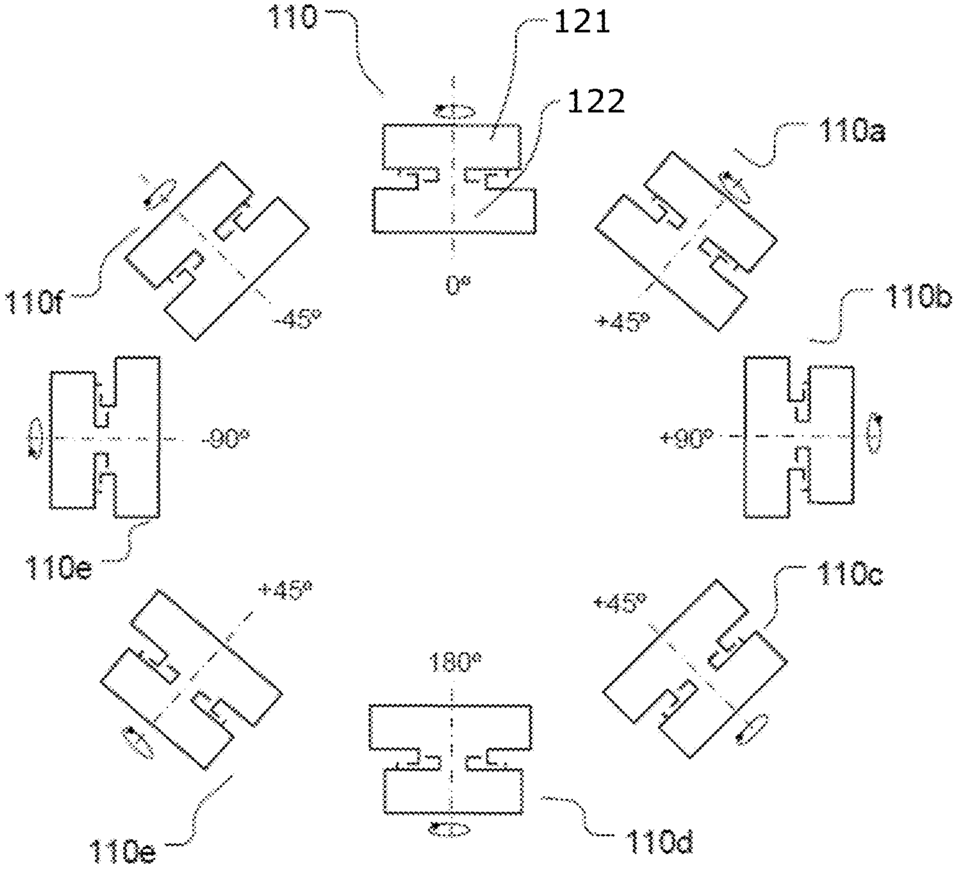
FIG. 7 illustrates 2D sections through the embodiment of FIGS. 3, 5, and 6 rotated 360 degrees around one axis in steps of 45 degrees.

FIG. 7 illustrates 2D sections through the embodiment of FIGS. 3, 5, and 6 rotated 360 degrees around one axis in steps of 45 degrees. The rotation corresponds to possible rotations of the light fixture during use. It should be understood, that the light fixture may be rotated substantially stepless and thereby may also be stopped at positions in between the illustrated steps of 45 degrees. The first and second attachments structures (see FIGS. 5 and 6) engage each other to form a rotational joint 110 between the first element 121 and the second element 122.

Figure 8:
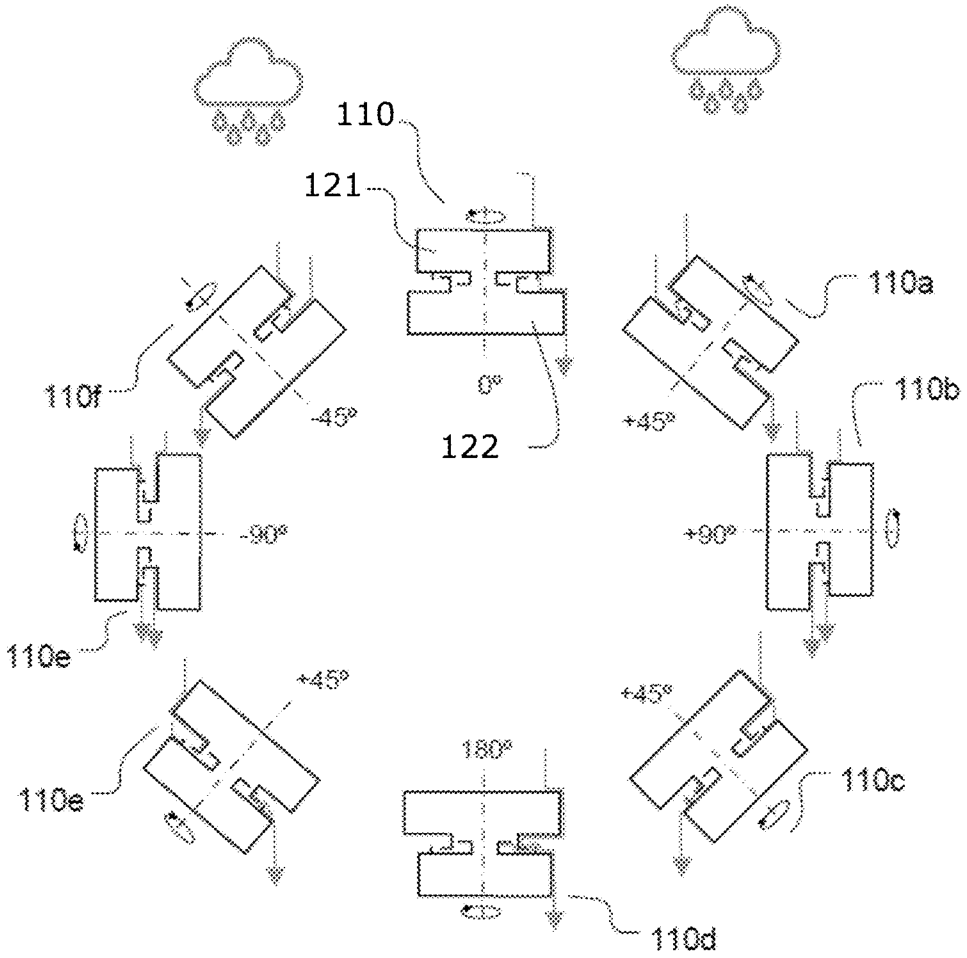
FIG. 8 illustrates the 2D sections of FIG. 7 with rain traces.

FIG. 8 illustrates the 2D sections of FIG. 7 where first and second attachments structures (see FIGS. 5 and 6) engage each other to form a rotational joint 110 between the first element 121 and the second element 122. On each of the sections, one or two arrows illustrate how rain is drained away from the first and second attachments structures and the openings (see FIGS. 5 and 6).

Figure 9:
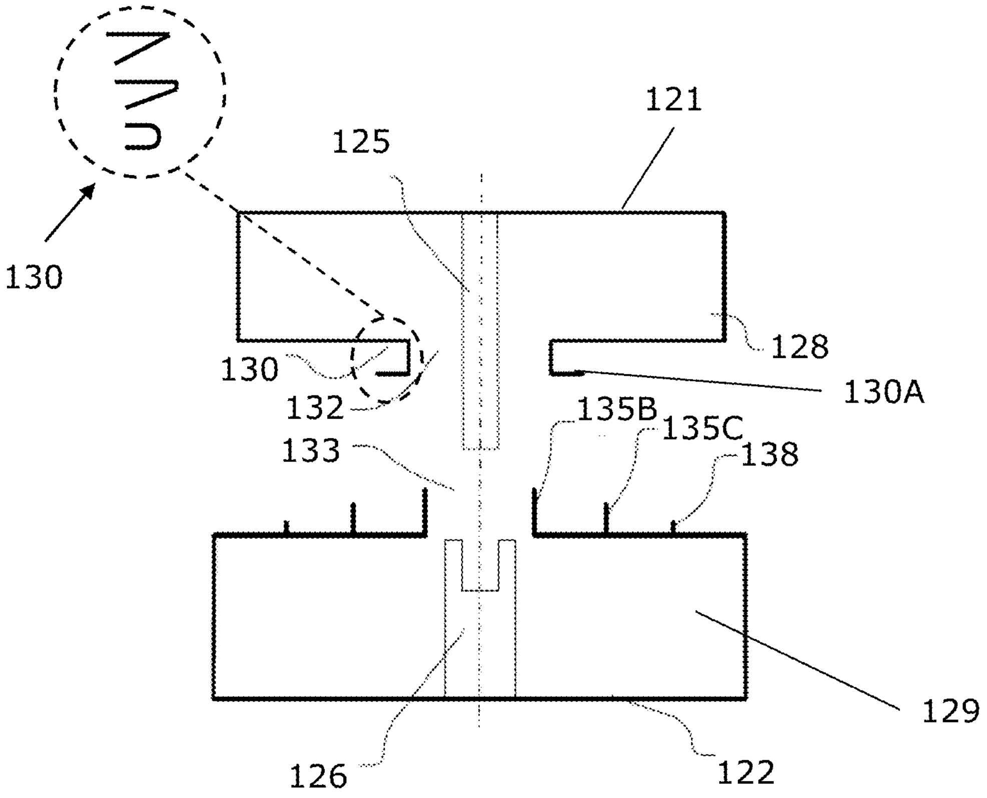
FIG. 9 illustrates a 2D section through the embodiment illustrated in FIG. 4.
Figure 10:
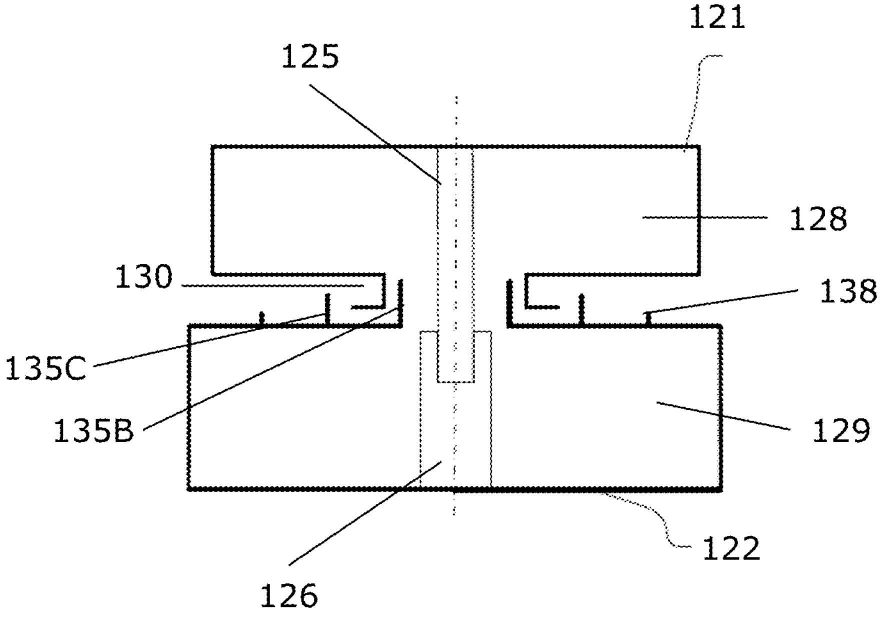
FIG. 10 illustrates the embodiment of FIG. 9 in assembled configuration.

FIG. 9 schematically illustrates a 2D section through the embodiment of the light fixture 100 illustrated in FIG. 4 in an un-assembled configuration. In FIG. 10, the embodiment illustrated in FIG. 9 is illustrated in an assembled configuration. The figures schematically illustrate the first and second elements of the light fixture whereas most of the different elements of the light fixture itself have be left out.

In FIG. 9, the first and second attachment structures 125, 126 do not engage. In FIG. 10, the first and second attachments structures 125, 126 engage each other to form a rotational joint 120 between the first element 121 and the second element 122.

The first element 121 comprises an outwardly projecting wall portion 130 forming a first collar circumferentially around a first opening 132 in the first element 121. The projecting wall portion 130 extends in a second direction being transverse to the first direction and terminates in a first free edge 130A outside the first compartment 128.

The first collar 130 may have another shape in an alternative embodiment, as described above in relation to the first collar 130 illustrated by the dotted circles.

In the illustrated embodiment, a second opening 133 is formed in the second element. The second element 122 comprises a groove 135B, 135C configured to receive the first collar 130 (see FIG. 10). The groove 135 extends circumferentially around a centre axis of the second attachment structure 126 and the second opening 133.

In the embodiment illustrated in FIGS. 9 and 10, the groove 135B, 135C comprises a first outwardly extending surface portion 135B and a second outwardly extending surface portion 135C, where each of the first and second outwardly extending surface portions 135B, 135C extends substantially towards the first element 121.

The second element 122 comprises a third outwardly extending surface portion 138. The third outwardly extending surface portion 138 extends circumferential around the groove formed by the first outwardly extending surface portion 135B and the second outwardly extending surface portion 135C, and the centre axis of the second attachment structure 126.

The height of the first outwardly extending surface portion 135B is larger than the second outwardly extending surface portion 135C which again is higher than the third outwardly extending surface portion 138, where the height is the distance from the outer surface of the second element 122 to the end point of each of the outwardly extending surface portions 135B, 135C, 138. By providing the outwardly extending surface portions with a height being lowest for the element being furthest away from the centre axis, drainage of water away from the compartments 128, 129 and the first and second attachment structures 125, 126 can be facilitated.

Figure 11:
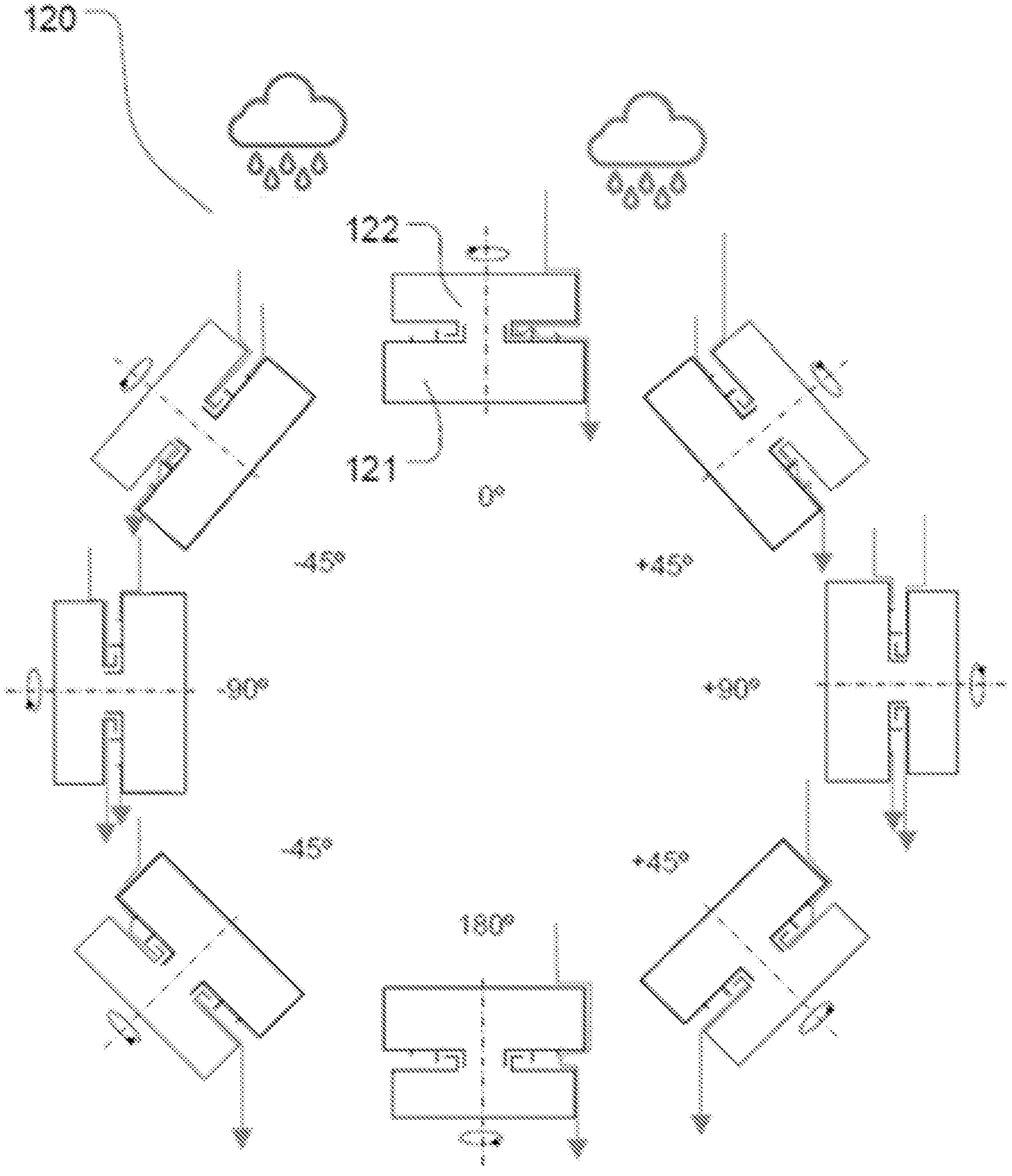
FIG. 11 illustrates 2D sections through the embodiment of FIGS. 4, 9, and 10 rotated 360 degrees around one axis in steps of 45 degrees with rain traces.

FIG. 11 illustrates 2D sections through the embodiment of FIGS. 4, 9, and 10 rotated 360 degrees around one axis in steps of 45 degrees with rain traces. The first and second attachments structures (see FIGS. 9 and 10) engage each other to form a rotational joint 120 between the first element 121 and the second element 122. On each of the sections, one or two arrows illustrate how rain is drained away from the first and second attachments structures and the openings (see FIGS. 9 and 10).

What is claimed is:

1. A light fixture comprising:

a first element and a second element joined by cooperating first and second attachment structures, wherein the first attachment structure is located in a first compartment in the first element and extends in a first direction towards the second element, wherein the second attachment structure forms part of the second element, wherein the first element comprises an outwardly projecting wall portion forming a first collar circumferentially around a first opening in the first element, the outwardly projecting wall portion extending in a second direction being transverse to the first direction and terminating in a first free edge outside the first compartment, wherein the second element comprises a groove configured to receive the first collar, the groove extending circumferentially around a centre axis of the second attachment structure.

2. The light fixture of claim 1, wherein the groove extends from an outer surface of the second element towards the first element.

3. The light fixture of claim 1, wherein the second element comprises a second compartment with a second opening, the second attachment structure being arranged in the second compartment.

4. The light fixture of claim 1, wherein the first attachment structure is configured to movably engage the second attachment structure thereby forming a rotational joint between the first and second elements.

5. The light fixture of claim 1, wherein the groove comprises a first outwardly extending surface portion and a second outwardly extending surface portion, each of the first and second outwardly extending surface portions extending towards the first element from an outer surface of the second element and terminating at an opposite end point, the first and second outwardly extending surface portions each extending circumferentially around the centre axis of the second attachment structure.

6. The light fixture of claim 5, wherein the first and second outwardly extending surface portions extend substantially parallel circumferentially around the centre axis of the second attachment structure.

7. The light fixture of claim 5, wherein the first and second outwardly extending surface portions each has a height being a distance from the outer surface of the second element to the opposite end point, the first outwardly extending surface portion being arranged closer to the centre axis of the second attachment structure, the second outwardly extending surface portion extending circumferentially around the first outwardly extending surface portion and the centre axis of the second attachment structure, the height of the first outwardly extending surface portion being larger than the height of the second outwardly extending surface portion.

8. The light fixture of claim 6, wherein the second element comprises a third outwardly extending surface portion, the third outwardly extending surface portion extending circumferentially around the first outwardly extending surface portion, the second outwardly extending surface portion, and the centre axis of the second attachment structure, a height of the third outwardly extending surface portion being smaller than a height of the first outwardly extending surface portion and a height of the second outwardly extending surface portion.

9. The light fixture of claim 5, wherein at least one of the first, second, and third outwardly extending surface portions extends circumferentially around the centre axis of the second attachment structure in a substantially circular shape.

10. The light fixture of claim 1, wherein the groove comprises a second outwardly projecting wall portion forming a second collar circumferentially around the centre axis of the second attachment structure, the second outwardly projecting wall portion extending in a third direction being transverse to the first direction and terminating in a second free edge outside the second element.

* * * * *